United States Patent

[11] 3,582,688

[72] Inventor Francis H. Hilbert
River Grove, Ill.
[21] Appl. No. 797,000
[22] Filed Feb. 6, 1969
[45] Patented June 1, 1971
[73] Assignee Motorola, Inc.
Franklin Park, Ill.

[54] CONTROLLED HYSTERESIS TRIGGER CIRCUIT
6 Claims, 2 Drawing Figs.

[52] U.S. Cl. .......... 307/272, 307/235, 307/279, 307/290, 307/315
[51] Int. Cl. .......... H03k 3/26
[50] Field of Search .......... 307/279, 289, 290, 315, 235, 272

[56] References Cited

UNITED STATES PATENTS

| | | | |
|---|---|---|---|
| 3,068,368 | 12/1962 | Grunwaldt | 307/289 |
| 3,118,601 | 1/1964 | Robb, Jr. | 307/290X |
| 3,209,135 | 9/1965 | Myer | 307/315X |
| 3,393,870 | 7/1968 | Jeffrey | 307/310X |
| 3,443,127 | 5/1969 | Zimmerman | 307/290 |
| 3,502,912 | 3/1970 | McAvoy | 307/310X |
| 3,510,694 | 5/1970 | Michael | 307/290 |

*Primary Examiner*—Stanley D. Miller, Jr.
*Attorney*—Mueller & Aichele

ABSTRACT: A stable electronic trigger circuit having a predetermined DC hysteresis in the operation of the circuit is formed as an integrated circuit including three NPN transistors: an input transistor and a pair of output transistors connected in a Darlington amplifier configuration directly driven from the collector of the input transistor. Operating potential for the trigger circuit is obtained from the voltage drop across a string of series connected transistor diodes, and the input transistor has collector and emitter resistors connected to it, with the collector resistor having an impedance many times that of the emitter resistor. The switching levels of the trigger circuit are determined by the ratio of the collector and emitter resistors in the input transistor circuit and/or by the base-emitter voltage drops across the transistors.

Inventor
FRANCIS H. HILBERT
BY Mueller, Aichele & Rauner
ATTYS.

CONTROLLED HYSTERESIS TRIGGER CIRCUIT

BACKGROUND OF THE INVENTION

Many applications exist for a trigger or squaring circuit having a built-in predictable hysteresis so that the circuit switches to a second state from a first state at one level and switches back again from the second state to the first state at a second level depending upon the hysteresis characteristics of the circuit. An application for a circuit of this type exists, for example, in stereo multiplex compatible receivers for effecting muting between stereo and monaural broadcasts or muting of stereo broadcast signals that are too weak to provide satisfactory operation of the receiver. In order effectively to utilize a trigger circuit of this type in controlling muting in stereo multiplex FM receivers and in other applications, it is necessary that the switch-on and switch-off levels of the trigger circuit be accurately controlled and that the hysteresis of this switching action be predictable and consistent in the operating environment of the circuit.

In addition to the foregoing, it is desirable to provide a trigger circuit which readily lends itself to integrated circuit applications, so that such a trigger circuit may be formed independently or as an integral part of a larger integrated circuit system. In order to provide the most efficient use of the area of the chip on which the circuit is to be placed, it is desirable to provide a trigger circuit having a minimum number of components which require large chip areas and utilizing, to the greatest extent possible, components requiring small chip areas.

SUMMARY OF THE INVENTION

Therefore, it is an object of this invention to provide an improved trigger circuit.

It is an additional object of this invention to provide a trigger circuit having predictable hysteresis of operation.

It is another object of this invention to provide a trigger circuit in which the gain of the switching transistors used has relatively little affect on the operation of the trigger circuit.

It is a further object of this invention to provide an integrated circuit trigger circuit requiring a minimum of chip area.

In a preferred embodiment of this invention, a trigger circuit is formed of an input transistor driving a pair of output transistors interconnected in a Darlington loop amplifier configuration; and means are provided for controlling the signal levels at which the input transistor is switched into and out of conduction.

DETAILED DESCRIPTION

Figure 1:
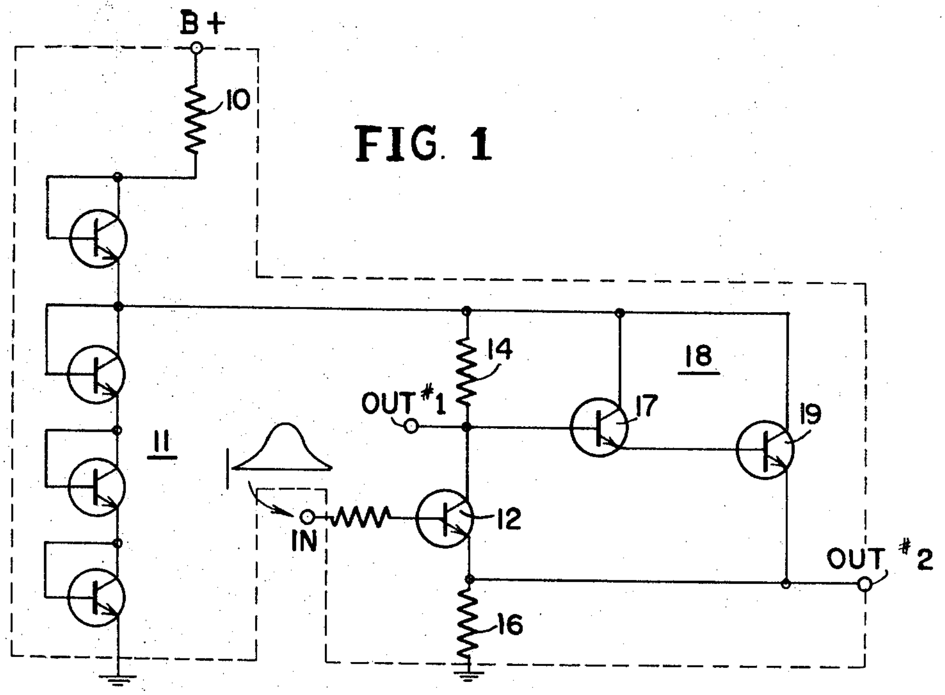
FIG. 1 is a schematic diagram of a preferred embodiment of a trigger circuit according to the invention.

Referring now to FIG. 1, there is shown enclosed in dotted lines an integrated trigger circuit in accordance with a preferred embodiment of the invention supplied with operating potential from a source of B+ through a series circuit including a resistor 10 and a string of semiconductor, series-connected transistor diodes 11 connected between the source of B+ and ground. The transistors 11 each have their bases and collectors interconnected and operate as diodes in their forward conducting direction. The voltage supplied from the source of B+ is sufficient to overcome the forward conduction voltage of these transistor diodes, which exhibit a characteristic of providing a predetermined nearly constant voltage drop thereacross irrespective of the amount of current flowing therethrough once the forward conduction threshold voltage has been exceeded. Each of the transistor diodes 11 appears as a single semiconductor junction operated in its forward direction, and the forward voltage drop across each of the transistors 11 is approximately 0.8 volts.

Operating potential for the trigger circuit is obtained from the junction between the first and second of the transistor diodes 11, leaving three transistor diodes 11 connected between this junction and ground to provide a regulated DC operating potential of approximately 2.4 volts for the trigger circuit. This potential is applied through a collector resistor 14 to the collector of an input transistor 12 in the form of an NPN integrated circuit transistor, the emitter of which is connected to ground through an emitter resistor 16. The collector of the transistor 12 also is connected to the base of a transistor 17 which is one of a pair of NPN transistors 17 and 19 interconnected in a Darlington loop circuit 18. The collectors of the transistors 17 and 19 are connected to the junction between the first and second of the transistor diodes 11, and the emitters of the transistor 19 and the transistor 12 are connected together and to an output terminal for the trigger circuit.

Whenever the input potential applied to the base of the input transistor 12 is below a predetermined amount, which will be explained later, the transistor 12 is nonconductive or "off" and the Darlington loop transistors 17 and 19 are conductive or "on" due to the fact that approximately the full potential voltage drop across the three transistor diodes 11 is applied from the collector of the transistor 12 to the base of the input transistor 17 of the Darlington pair to forward bias the transistors 17 and 19. In the operation of the Darlington amplifier 18, the base current drawn through the transistor 17 when it is conductive is very small. As a result very little current passes through the resistor 14 so that the gain of the transistors 17 and 19 is of little or no consequence in the operation of the circuit. Thus, the voltage drop across the conductive Darlington transistors 17 and 19 amounts to the voltage drop across two semiconductor junctions in the integrated circuit. This causes the voltage drop across the resistor 16 to be equivalent to the drop across one semiconductor junction in the circuit. This result is obtained since the total potential provided to the trigger circuit is equivalent to the voltage drop across three semiconductor junctions; so that if a voltage drop equivalent to that across two semiconductor junctions occurs in the Darlington loop 18, the drop across the resistor 16 necessarily must be equal to the remainder of the total available potential whenever the Darlington amplifier transistors 17 and 19 are conductive.

As a consequence, the input voltage applied to the base of the transistor 12 required to drive that transistor into conduction must equal the voltage drop across two semiconductor diode junctions in the integrated circuit and this is approximately 1.6 volts (assuming 0.8 volts per junction). When this potential is reached, the input transistor 12 is rendered conductive; and regenerative action takes place, with the transistor 12 saturating and the transistors 17 and 19 being rendered nonconductive. When the transistor 12 is conducting, the voltage drop across the emitter resistor 16 is a function of the ratio of the resistance of the resistor 14 and resistance 16 and of the collector-emitter voltage drop across the transistor 12.

In order to provide a desired hysteresis in the operation of the circuit, the resistor 14 is chosen to have a value of resistance greater than that of the resistor 16, with values of 5,000 ohms and 500 ohms being used for the resistors 14 and 16, respectively, in a version of the circuit which was operated. It should be noted, however, that these values are relative values only and that other values and other ratios could be substituted for those used in this illustration. With the 10 to 1 ratio, however, being used in the circuit for the resistors 14 and 16, the potential present on the collector of the transistor 12 when it is conducting at saturation equals approximately 0.22 volts which is computed by the following formula, assuming the saturation voltage drop across the transistor 12 is negligible:

$$V_{R16} \cong \frac{R16}{R14+R16}(3\phi)$$

where Φ equals the voltage drop across a semiconductor junction in the integrated circuit. Substituting the values of the above example into the formula gives:

$$\frac{500}{5500}\times 2.4V \cong .22 \text{ volts.}$$

Thus, the output voltage at the emitter of the output transistor 19 drops from 0.8 volts to 0.22 volts when the trigger circuit is switched from its first state to its second state; and the output voltage present on the collector of the input transistor 12 drops from 2.4 volts to approximately 0.22 volts.

If the input signal then decreases from the value required to switch the transistor 12 into saturation, the transistor 12 continues to be in a state of saturation until the input voltage reaches an amount which is equal to the voltage drop across one semiconductor junction plus the voltage drop present across the resistor 16 (0.22 volts in the example under consideration). Since the voltage drop across a semiconductor junction is 0.8 volts in the example under consideration, the transistor 12 remains saturated until the input voltage applied to its base reaches 1.02 volts. This is the minimum voltage which provides a forward voltage drop across the base-emitter junction of the transistor 12 to maintain it in saturation when 0.22 volts are dropped across the resistor 16 from the input potential. As the input voltage continues to drop below this amount, the transistor 12 remains conductive but is pulled out of saturation and the voltage across the resistor 16 decreases due to the increased drop across the collector-emitter junction of the transistor 12. When the input voltage decreases to 0.87 volts, the transistor 12 is rendered fully nonconductive; and the transistors 17 and 19 are driven fully conductive so that the circuit is in its initial state of operation with 0.8 volts potential appearing across the resistor 16. The particular operating level of 0.87 volts where the transistor 12 switches to nonconductive is determined by the fact that when a voltage drop equivalent to that across two semiconductor junctions occurs across the base-emitter path of the Darlington circuit 18, it is rendered fully conductive. Thus, at the time that the voltage drop across the collector-emitter junction of the transistor 12 reaches an amount equivalent to the drop across two semiconductor junctions (1.6 volts), the voltage from the power supply remaining to be dropped across the resistors 14 and 16 is equal to 0.8 volts (the drop across one semiconductor junction) since the total supply voltage is 2.4 volts. Of this remaining amount, 0.07 volts appears across the resistor 16 ($500/5500\times\cong^{0.8}$V). This amount, added to the 0.8 volts drop across the base-emitter junction of the transistor 12 provides the input voltage just needed to maintain the transistor 12 conductive with a 1.6 volt drop across its collector-emitter junction. As a result, when the input voltage drops to 0.87 volts, the Darlington transistors are rendered conductive, causing the drop across the resistor 16 to rise to 0.8 volts and the transistor 12 is rendered nonconductive. The circuit thus reverts to its first state of operation.

It should be noted that the hysteresis of operation in this circuit from one state to another state is equal to 0.73 volts, due to the fact that the ratio of the resistors 14 and 16 is chosen to be 10 to 1. If a different switching hysteresis were desired in this circuit, this ratio could be altered to any desired value by altering the relative values of the switching level control resistors 14 and 16; so that the circuit provides a flexible means of accurately determining the switching hysteresis between turn-on and turnoff of the input transistor 12 and thus the changes in the output potentials obtained from either the emitter of the output transistor 19 (output No. 2) or the collector of the input transistor 12 (output No. 1).

Since changing this ratio of the resistors 14 and 16 to a lower ratio would render the circuit more dependent upon the characteristics of the resistors 14 and 16, however, a preferred manner of changing the hysteresis is to change the number of transistor diodes 11 across which the voltage supply to the trigger circuit 18 is obtained and/or to vary the number of transistors used in the Darlington output stage, i.e., to use three or more cascaded output transistors connected in a Darlington amplifier configuration to obtain the desired voltage drop across the output stage. At the same time, the ratio of the resistors 14 and 16 should be high, with the resistance of the resistor 14 being many times the resistance of the resistor 16; so that the voltage drop across the resistor 16 is low. By operating in this manner, the hysteresis control is substantially independent of the resistances 14 and 16.

Figure 2:
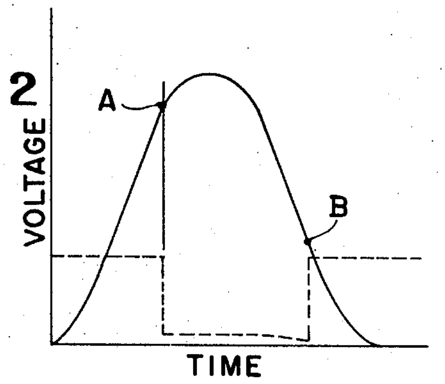
FIG. 2 shows wave forms useful in describing the operation of the circuit shown in FIG. 1.

The foregoing operation and its effect on the output of the circuit may be more clearly understood from reference to FIG. 2 which shows in a solid line the input signal applied to the base of the transistor 12. The dotted line indicates the output signal obtained from the emitter of the output transistor 19, with the switching on point of the input transistor 12 occurring when the input voltage reaches point "A", and the switching off point of the input transistor 12 occurring when the input voltage drops to point "B". It can be seen that a definite hysteresis in the switching on and switching off voltage levels occurs in the operation of this circuit; so that when the circuit is used to provide a switching between one or the other of two conditions, it prevents hunting or oscillation about a switching point.

In addition to providing the advantages outlined above, the circuit shown in the drawing and described above provides an operation which is independent of the gain of the transistors used since when the Darlington output transistors 17 and 19 are rendered conductive, little or no base current is drawn by the transistor 17. This feature is especially desirable for providing a trigger circuit which is relatively unaffected by changes in ambient temperature, aging of the transistors, or supply voltage variations.

In addition, the circuit configuration is readily adapted to integrated circuit techniques so that the entire trigger circuit may be readily fabricated as part of an integrated circuit package with a minimum space requirement for the trigger circuit.

While the circuit has been described in conjunction with a particular supply voltage, and using NPN transistors, it should be understood that different supply voltages and different transistor conductivity types may be utilized.

It is claimed:

1. A trigger circuit having a predetermined controlled hysteresis of operation including in combination:
   - an input transistor having collector, emitter, and base electrodes;
   - a plurality of cascaded output transistors each having collector, emitter, and base electrodes, with the base electrode of the first output transistor being directly connected to the collector electrode of the input transistor and with the emitter of each output transistor except the last being directly connected only to the base of the next succeeding output transistor, the collectors of the output transistors being coupled with a source of operating potential and the emitters of the input transistor and the last output transistor being interconnected;
   - a collector resistance connected to the collector of the input transistor;
   - means for connecting a source of regulated direct current operating potential to the collector resistance of the input transistor;
   - an emitter resistance having value substantially less than the value of the collector resistance connected between the emitter of the input transistor and a source of reference potential; and
   - means for supplying varying input signals to the base of the input transistor to cause the input transistor to be switched into conduction at a first predetermined level and to be switched into a nonconductive state at a second predetermined level, as established by the parameters of the collector and emitter resistors and the transistors used in the circuit.

2. The combination according to claim 1 wherein all of the transistors are NPN transistors and wherein the transistors, and the collector and emitter resistors all are formed in a single integrated circuit.

3. The combination according to claim 1 wherein the plurality of output transistors include first and second output transistors interconnected as a Darlington amplifier pair.

4. The combination according to claim 1 wherein the regulated direct current operating potential is a predetermined constant operating potential.

5. The combination according to claim 4 wherein the predetermined constant operating potential is obtained from the voltage drop across a predetermined number of series-connected, forward-biased semiconductor diodes.

6. The combination according to claim 5 wherein the plurality of output transistors includes first and second output transistors interconnected as a Darlington amplifier pair and the predetermined number of semiconductor diodes is three series-connected, forward-biased semiconductor diodes.